(12) United States Patent
Smith et al.

(10) Patent No.: US 11,460,347 B2
(45) Date of Patent: Oct. 4, 2022

(54) OPTICAL FREQUENCY MEASUREMENT DEVICE

(71) Applicant: Lumentum Operations LLC, San Jose, CA (US)

(72) Inventors: Colin Smith, Paignton (GB); Adrian Perrin Janssen, Devon (GB); Stuart Conley, Paignton (GB)

(73) Assignee: Lumentum Operations LLC, San Jose, CA (US)

( * ) Notice: Subject to any disclaimer, the term of this patent is extended or adjusted under 35 U.S.C. 154(b) by 3 days.

(21) Appl. No.: 16/949,715

(22) Filed: Nov. 11, 2020

(65) Prior Publication Data

US 2021/0262862 A1      Aug. 26, 2021

Related U.S. Application Data

(60) Provisional application No. 62/980,761, filed on Feb. 24, 2020.

(51) Int. Cl.
*G01J 9/02* (2006.01)
*G02B 17/00* (2006.01)
*G02B 27/10* (2006.01)

(52) U.S. Cl.
CPC .......... *G01J 9/0246* (2013.01); *G02B 17/006* (2013.01); *G02B 27/1013* (2013.01); *G01J 2009/0257* (2013.01)

(58) Field of Classification Search
CPC .... G01J 9/0246; G01J 2009/0257; G01J 3/26; G02B 17/006; G02B 27/1013; G02B 5/284
See application file for complete search history.

(56) References Cited

U.S. PATENT DOCUMENTS

| | | | |
|---|---|---|---|
| 2003/0173505 A1* | 9/2003 | Wipiejewski | G01J 9/02 250/226 |
| 2004/0228375 A1* | 11/2004 | Ghosh | G02B 6/4215 372/32 |
| 2021/0088383 A1* | 3/2021 | Kimura | G01J 9/00 |

* cited by examiner

*Primary Examiner* — Jonathan M Hansen
(74) *Attorney, Agent, or Firm* — Harrity & Harrity, LLP

(57) ABSTRACT

An optical locker may include an assembly. The assembly may include a beam splitter, configured to split an input beam into at least three beams; an etalon having at least three regions, positioned so that each beam passes through a different region; a detector configured to measure output intensities, Tn, of the etalon for the beam; and a controller configured to determine a ratio, Ta/Tb, of the output intensities, wherein that ratio has a slope at the output intensities which is above a threshold, obtain a target frequency of the input beam, and determine an actual frequency of the input beam based on the target frequency and the ratio of the output intensities.

20 Claims, 9 Drawing Sheets

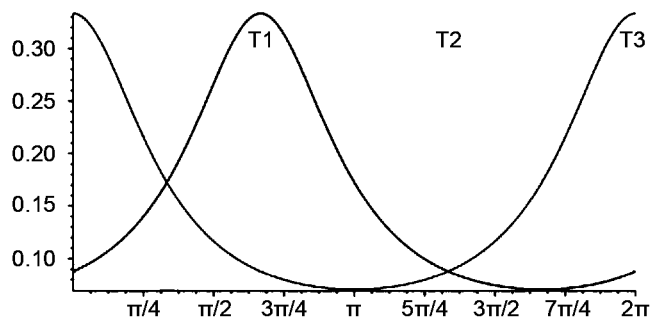
FIG. 5A
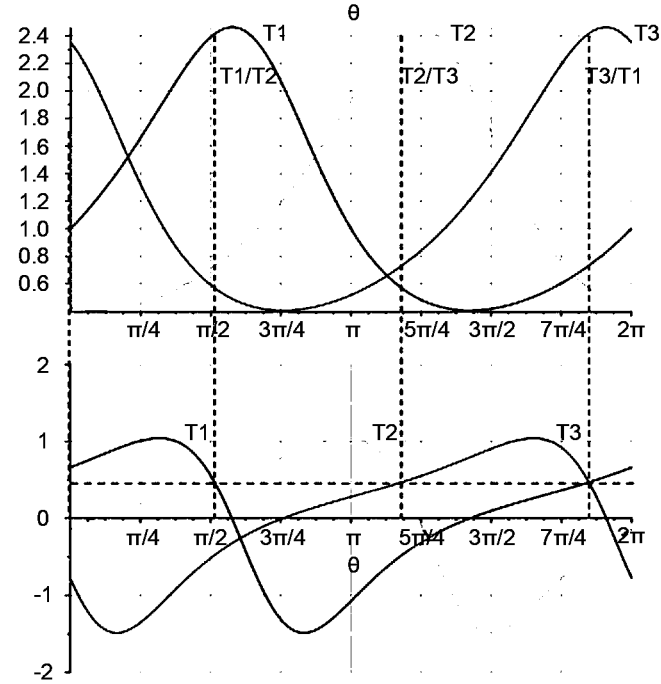
FIG. 5B
FIG. 5C

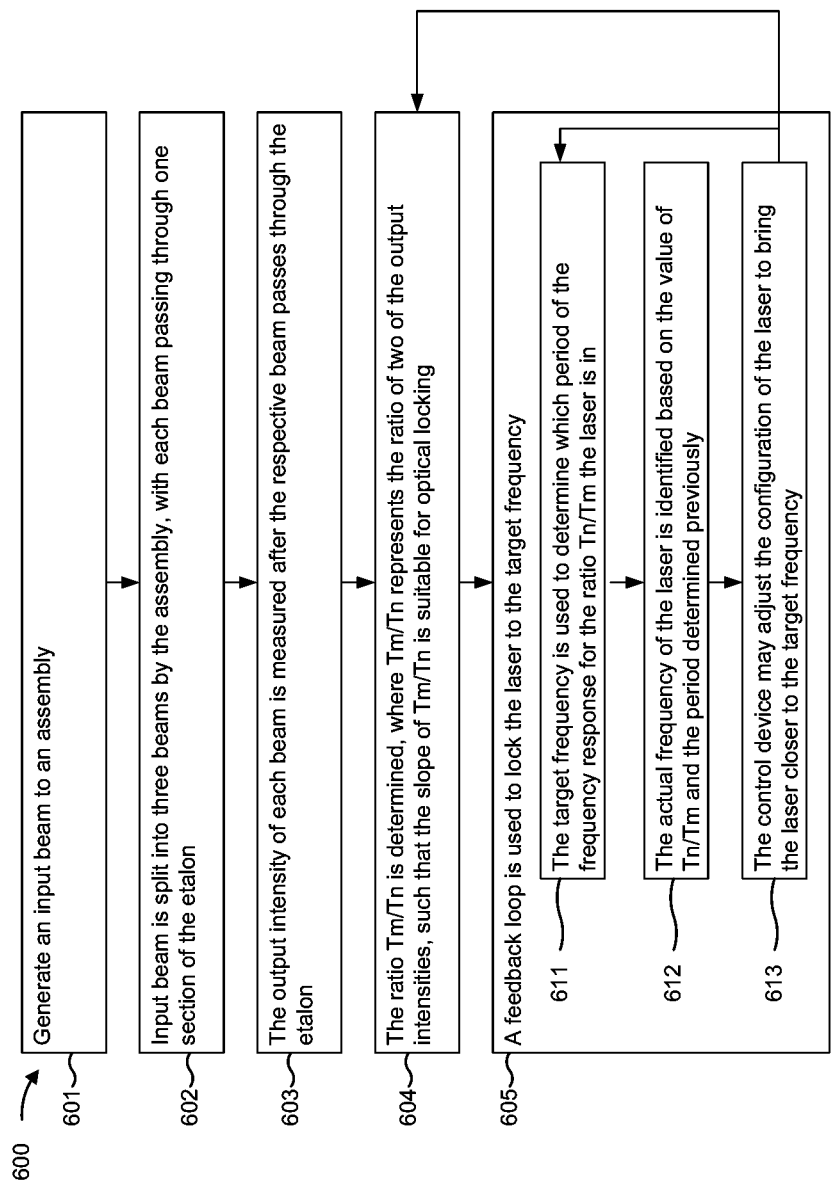

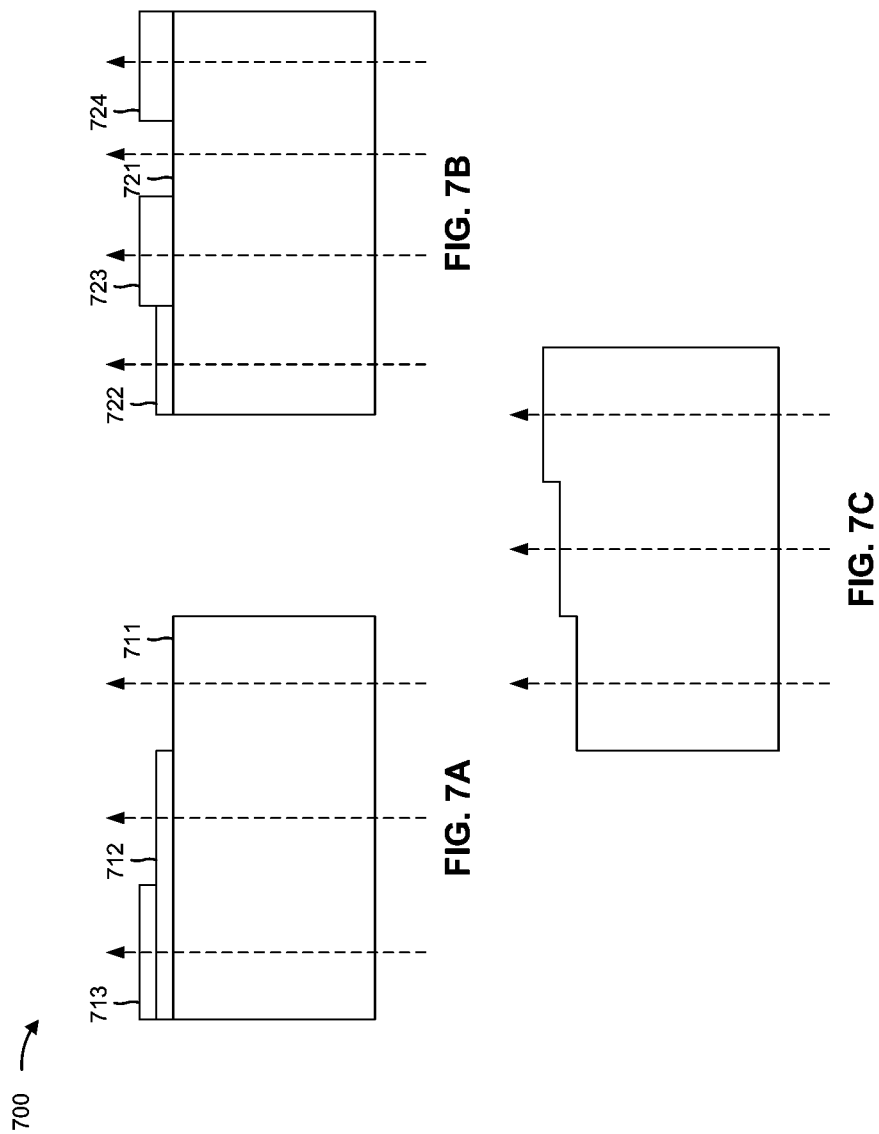

OPTICAL FREQUENCY MEASUREMENT DEVICE

CROSS-REFERENCE TO RELATED APPLICATION

This patent application claims priority to U.S. Provisional Patent Application No. 62/980,761, filed on Feb. 24, 2020, and entitled "ETALON-BASED WAVELENGTH LOCKER." The disclosure of the prior application is considered part of and is incorporated by reference into this patent application.

TECHNICAL FIELD

The present disclosure relates generally to devices for the measurement of frequency or wavelength of beams and to optical lockers for lasers and assemblies for use therein.

BACKGROUND

In fiber-optic communications channels, dense wavelength division multiplexing (DWDM) is used to transmit multiple optical signals via a single fiber. For such applications, each of the channels has a distinct frequency, The frequencies of optical signals produced by laser sources are locked to the target frequencies by an optical locking mechanism. The optical locking mechanism may measure a wavelength or a frequency of an optical signal and may use a feedback loop to adjust the output of a corresponding laser source based on the measurement.

In some cases, the optical locking mechanism may include a Fabry-Perot (FP) etalon or interferometer for measuring the wavelength or frequency. An example FP etalon is illustrated in FIG. 1A, and includes a transparent plate with two reflecting surfaces. As light bounces between the surfaces, transmitted rays interfere with each other, producing a characteristic interference pattern, which is based on the frequency and the optical distance between the plates.

The frequency response of an FP etalon has a characteristic curve shown in FIG. 1B. To provide the greatest resolution for the frequency measurement device, the FP etalon is calibrated such that the desired frequency is in a region of the frequency response graph with a high gradient. As a result, small changes in the frequency may produce large changes in the output.

As indicated above, FIGS. 1A and 1B are provided as an example. Other examples may differ from what is described with regard to FIGS. 1A and 1B.

FIG. 2 shows an example of a frequency measuring device incorporating an etalon such as the FP etalon shown in FIG. 1A. The frequency measuring device includes an etalon 201, an output monitor 202, a reference monitor 203, and a beam splitter 204. An input beam 210 arrives at the beam splitter and is split into a measurement beam 211 and a reference beam 212. As described above, the measurement beam passes through the etalon, and the intensity of the beam is measured by the output monitor 202.

However, the intensity of the output beam may not be a useful quantity without also having a measurement of the intensity of the input beam (e.g., to enable a determination of the correct wavelength is the transmission of the etalon). Consequently, a portion of the power of the input beam is diverted using the beam splitter 204 to provide a reference beam 212, and the intensity of the reference beam is directly measured (without passing through the etalon) by the reference monitor 203 to give a reference measurement. The reference measurement and the output of the etalon are compared in order to determine the frequency.

As indicated above, FIG. 2 is provided as an example. Other examples may differ from what is described with regard to FIG. 2.

There is now a trend toward gridless operation. In gridless operation, operation of fiber optic communications or other laser applications is performed at a frequency which is not on a set grid. When a single etalon and a reference beam are used, there may be regions where an accurate determination of the frequency cannot be made easily, for example, because the slope of the wavelength/intensity relationship is near-zero. In such cases, a small error in the intensity measurement may result in an unacceptably large error in the wavelength (e.g., the signal to interference and noise ratio (SINR) depends on the slope, with areas of low slope having a low SINR).

To alleviate this, a frequency measuring device may be made with two etalons, configured such that the maxima and minima of the wavelength response of one etalon is located at or close to the location of maximum slope of the wavelength response of the other etalon. In some cases, there is an optimum phase offset between the two etalons, and it can be shown that this maximizes the available slope (and therefore the SINR) at all points of the wavelength response. Such a device may still require a separate reference beam, as described above. FIG. 3A shows an example of the response of such a two-etalon device as a function of a relative phase difference which can be equated to a wavelength or frequency, and FIG. 3B shows an example of the slope of the graph of FIG. 3A. As can be seen, at all points one of the responses has a slope of at least |0.336| per radian. As indicated above, FIGS. 3A and 3B are provided as an example. Other examples may differ from what is described with regard to FIGS. 3A and 3B.

However, there is now a trend toward more precise frequency control in gridless operation. Consequently, there is a need for an optical frequency measurement device that can achieve an improved SINR and can lock a frequency more accurately at any point within a wide range. In addition, the use of a reference beam reduces the efficiency of the optical frequency measurement device, so there is a need for solutions which do not require a reference beam.

SUMMARY

According to some possible implementations, an assembly may include a beam splitter, configured to split an input beam into at least three beams. The assembly may include an etalon having at least three regions, positioned so that each beam passes through a different region, wherein each region has a different path length such that each region has a free spectral range similar to the free spectral range of the other regions, and wherein each region has transmission peaks, which are separated from the transmission peaks of the other regions by a phase difference. The assembly may include a detector configured to measure output intensities $T_n$ (n=1, 2, 3) of the etalon, for the beam. The assembly may include a controller configured to determine a ratio $T_a/T_b$ (a, b=1, 2, 3, a b) of the output intensities, wherein that ratio has a slope at the output intensities which is above a threshold.

According to some implementations, an optical locker may include an assembly. The assembly may include a beam splitter, configured to split an input beam into at least three beams; an etalon having at least three regions, positioned so that each beam passes through a different region; a detector configured to measure output intensities, Tn, of the etalon for the beam; a controller configured to: determine a ratio Ta/Tb of the output intensities, wherein that ratio has a slope at the output intensities which is above a threshold, obtain a target frequency of the input beam, and determine an actual frequency of the input beam based on the target frequency and the ratio of the output intensities.

According to some possible implementations, a method may include splitting, by an optical locker, an input beam into at least three beams, and passing each beam through a different region of an etalon of the optical locker; providing, by the optical locker, a target frequency of the input beam; measuring, by the optical locker an output intensity of each beam; determining, the optical locker, a ratio Ta/Tb of output intensities, wherein that ratio has a slope at the output intensities which is above a threshold; determining, by the optical locker an actual frequency of the input beam based on the target frequency and the ratio Ta/Tb of output intensities; and providing, by the optical locker, information identifying the actual frequency of the input beam based on determining the actual frequency.

BRIEF DESCRIPTION OF THE DRAWINGS

FIG. 5A shows an example of a response of the assembly of FIG. 4 as described herein.

FIG. 5B shows an example of ratios of the responses of FIG. 5A as described herein.

FIG. 5C shows an example of a slope (derivative) of the ratios of FIG. 5B as described herein.

FIG. 6 is a flowchart of an example process relating to locking a laser.

FIGS. 7A-7C are example schematic illustrations of exemplary solid etalons described herein.

DETAILED DESCRIPTION

The following detailed description of example implementations refers to the accompanying drawings. The same reference numbers in different drawings may identify the same or similar elements.

Some implementations described herein provide an optical frequency measurement device that achieves gridless operation over a wide frequency band and is self-normalizing (e.g., the optical frequency measurement device does not require the use of a reference beam). For example, an optical frequency measurement device may use an etalon having three or more regions, each region having a different path length. In some implementations, the etalon and the multiple regions thereof are formed from a single element (e.g., a monolithic element). The frequency responses of each region are such that the frequency responses have a similar free spectral range (FSR), but are spread out in phase, as described in more detail below. The input beam is split into three beams, each beam is directed into one of these regions, and the intensity of each beam after passing through the etalon is measured.

Figure 4:
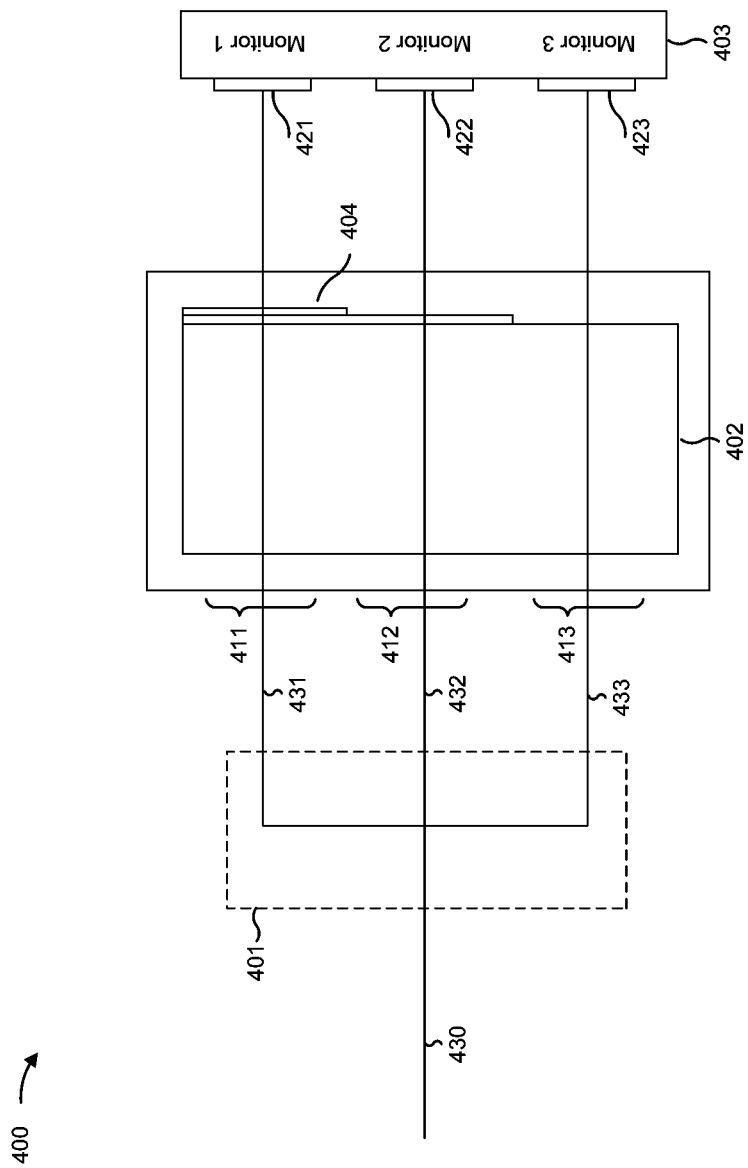
FIG. 4 shows an example assembly for use in an optical frequency measurement device described herein.

FIG. 4 is a diagram of an example 400 of an assembly for use in the optical frequency measurement device. For example, the assembly may include a 3-way beam splitter 401, an etalon 402 having regions 411, 412, and 413, and a monitor array 403 having three monitors 421, 422, and 423. Each of the regions may have a different thickness, provided by additional laminations 404 on a side of the etalon, which result in the side of the etalon having a stepped profile. In some implementations, each lamination 404 may span a single region of the etalon. This difference in thickness produces a phase difference between the three beams, such as a phase difference of $2\pi/3$.

An input beam 430 may be split by the beam splitter 401 into three measurement beams 431, 432, and 433, each of which is directed through a respective one of the regions 411, 412, and 413 of the etalon, and then the intensity of the output beam from each region is measured by the respective monitors 421, 422, and 423. Rather than comparing the intensity of each output beam to a reference beam, the optical frequency measurement device may take the ratio of the output corresponding to each region with the output corresponding to each other region (see FIGS. 5A-5C).

As indicated above, FIG. 4 is provided as an example. Other examples may differ from what is described with regard to FIG. 4. The number and arrangement of devices shown in FIG. 4 are provided as an example.

Figure 1A:
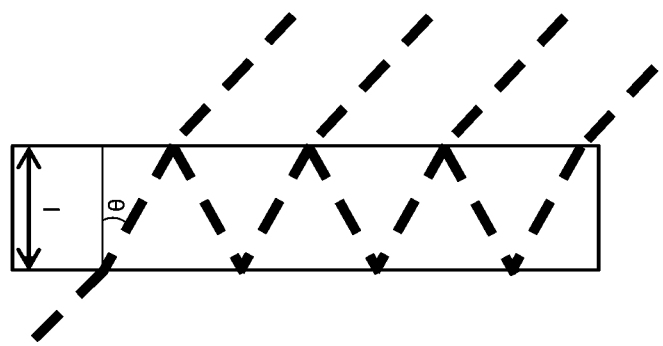
FIG. 1A is a diagram of an example of an etalon described herein.
Figure 1B:
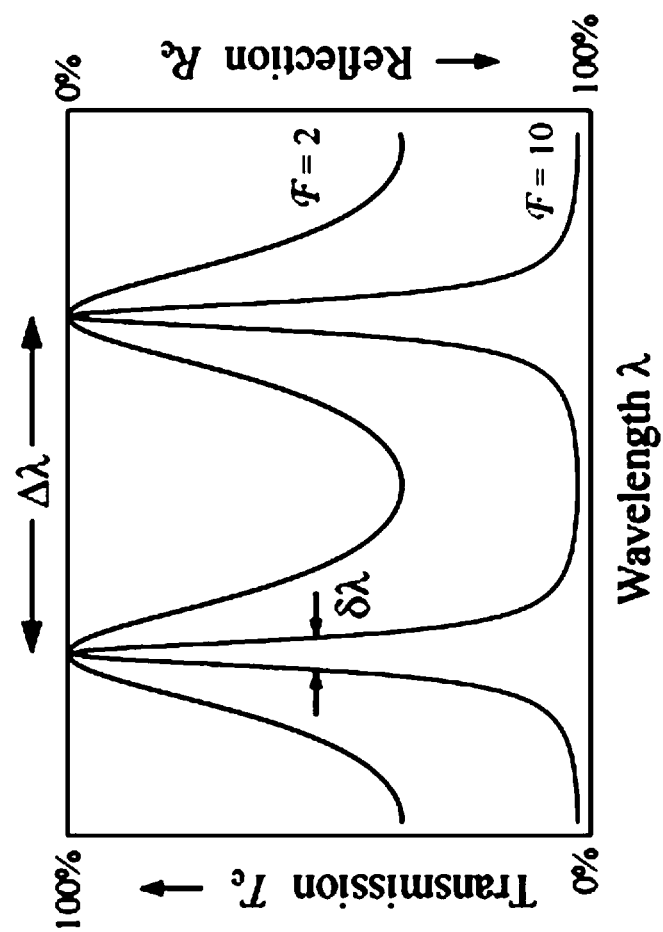
FIG. 1B shows an example of a frequency response curve for etalons at different finesse values as described herein.
Figure 2:
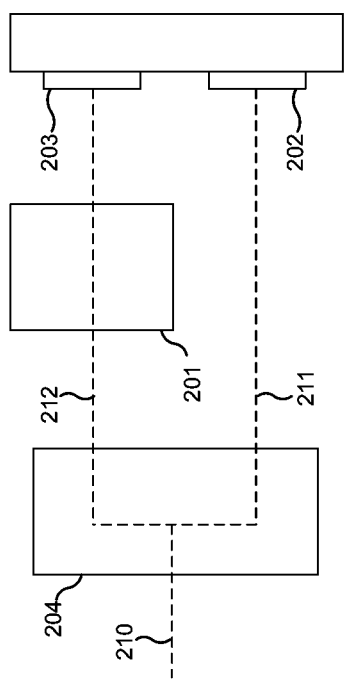
FIG. 2 shows an example of an optical locker described herein.
Figures 3A, 3B:
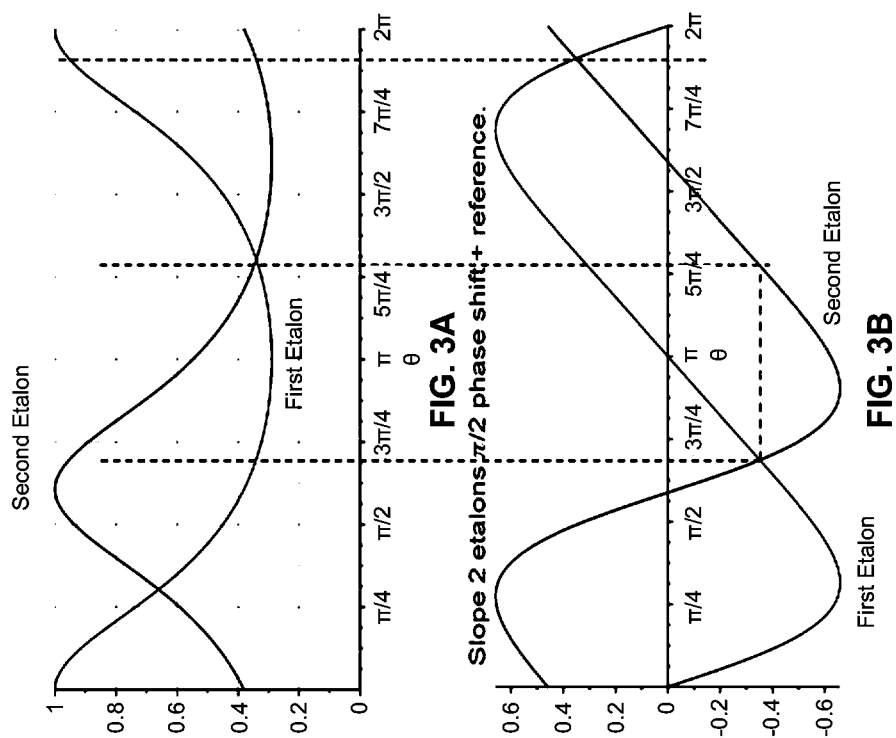
FIG. 3A shows an example of a response of a two etalon optical frequency measurement device described herein.
FIG. 3B shows an example of a slope (derivative) of curves in FIG. 3A as described herein.

FIG. 5A shows an example of a response of each output beam T1, T2, and T3 against a relative phase difference (as with FIG. 3A, this may be related to wavelength or frequency). The corresponding ratios T1/T2, T2/T3, and T3/T1 are shown in FIG. 5B. FIG. 5C shows the slopes of the graphs of FIG. 5B. As in the two-etalon reference case of FIGS. 3A and 3B, an acceptable slope can be obtained at points within the FSR by selecting one of the ratios with a slope above a desired threshold. The selected ratio may be the ratio with the greatest slope (e.g., of all ratios at the measured output intensities), or the selected ratio may be any ratio with a slope that satisfies a threshold.

The ratios in FIG. 5B may be self-normalizing (e.g., independent of beam power). As a result, no reference beam is required to determine a frequency (within the FSR). In some implementations, the ratios are periodic (e.g., the response repeats with a period equal to the FSR of the etalons). In some implementations, the determined ratio may be used to identify a specific frequency within an FSR, but will also correspond to a series of frequencies across different FSRs of the etalon. For example, when the frequency measuring device is an optical locker for a laser, the optical locker may be provided with an estimated frequency for the laser (e.g., from the calibration of the laser), and a value for one of the ratios Ta/Tb. The estimated frequency may be used to determine which FSR the actual frequency is in (e.g., which period of the response), and the value Ta/Tb may identify the exact frequency within that FSR. In this case, the error range of the estimated frequency may be less than the FSR of the etalon.

Although in some aspects the FSR is described herein as a single value, in other aspects there may be multiple different FSRs. For example, the three etalons, described above, may have different respective FSRs; however, the multiple FSRs may differ by a smaller amount than the average or nominal FSR of the etalons. In this case, the FSRs of the three etalons may differ by less than 2%, less than 1%, or less than 0.5%, among other examples, from each other.

While the above example shows three beams, three regions of the etalon, and three ratios, more than three beams may be used, with each beam passing through a respective region with a different thickness, and with some or all of the available ratios of the beams being used to determine the wavelength. Using more beams and regions allows for improved accuracy at a larger FSR (e.g., allowing for the measuring device to support a broader error range in the estimated frequency or wavelength).

A control device may obtain the wavelength (or frequency) from the measured ratio and the initial wavelength (or frequency) estimate by determining a period of the etalon response for the estimated wavelength. For example, for etalons with an average FSR of F, and an initial estimated wavelength of E, the actual wavelength may be determined to be in the range $(E-F/2)<\lambda<(E+F/2)$, where $\lambda$ represents the actual wavelength. This range includes a single period of the wavelength response of the etalons, so by determining the position in the period to which the measured signals correspond, the control device may uniquely determine the actual wavelength. The control device may determine the ratios Ta/Tb of the measured intensities, and may examine one of the ratios with a slope above a predetermined threshold to determine the location in the period. For example, as shown in FIG. 5B, for a given value of each ratio, there are at most two wavelengths within each period that correspond to that value. For example, a measurement of 1.7 on the ratio T1/T2 could correspond to a phase slightly above $\pi/4$, or a phase slightly above $13\pi/16$ (and the control device may determine the wavelength corresponding to each phase using the FSR and the wavelength corresponding to one point in the period—for example, the peak of T3, which is phase 0 in FIG. 5B). For errors of less than a threshold amount on the estimated wavelength (e.g., sufficiently small that the error does not overlap both points), the control device may disambiguate between points by choosing the point within the error on the estimated wavelength. Otherwise, the control device may disambiguate between points either by dithering the laser to determine whether the slope of the ratio is positive or negative, or by examining another ratio (since examining any combination of two of the ratios in FIG. 5B may uniquely define a point within a period).

As indicated above, FIGS. 5A-5C are provided as an example. Other examples may differ from what is described with regard to FIGS. 5A-5C.

FIG. 6 is a flowchart of an example process 600 for locking a laser with an optical frequency measurement device incorporating an assembly according to FIG. 4. In some implementations, steps of example process 600 may be performed by a control device. Additionally, or alternatively, steps described as being performed by another device may be performed as a response to a control signal from a control device. In some implementations, a laser, described herein, may have a predetermined target frequency and a known or approximated frequency error.

In step 601, a laser may generate an input beam to an assembly. The laser may generate the input beam via a beam splitter, or for lasers with both forward and rear beam outputs, the rear output may be used as the input beam to the optical frequency measurement device, leaving the forward output free for another purpose. Additionally, or alternatively, other techniques for providing an input beam for optical locking of a laser may be used.

In step 602, the input beam may be split into three beams by the assembly, with each beam passing through one section of the etalon. As described above, all of the etalon sections may have a similar FSR, but may be separated by a phase difference (e.g., $2\pi/3$).

In step 603, the output intensity of each beam may be measured after the respective beam passes through the etalon. For example, the control device may use a measurement component of the assembly to measure the output intensity of each beam. Additionally, or alternatively, the control device may obtain a measurement of other beam properties to allow determination of the transmission of the etalon.

In step 604, the ratio Tm/Tn may be determined, where Tm/Tn represents the ratio of two of the output intensities, such that the slope of Tm/Tn is suitable for optical locking (e.g., above a threshold or the greatest slope of the possible ratios). When determining which ratio or ratios have a slope that is usable, the control device may calculate the ratio Ta/Tb for each pair of output intensities, determine which of the output intensities has the greatest slope (e.g., via dithering the laser), and determine which ratio Tm/Tn has a usable slope based on a result of calculating the ratio and determining which output intensities have the greatest slope. In some implementations, the ratio Ta/Tb is self-normalizing, so the control device may determine the slope for a given ratio directly from the value of that ratio (to within two options representing the positive and negative slopes).

In step 605, a feedback loop may be used to lock the laser to the target frequency. For example, in step 611: the target frequency may be used to determine which period of the frequency response for the ratio Tn/Tm the laser is in; in step 612: the actual frequency of the laser may be identified based on the value of Tn/Tm and the period determined previously (e.g., this may be done by a pre-calibrated function or lookup table); and in step 613: the control device may adjust the configuration of the laser to bring the laser closer to the target frequency and repeat from step 611, or from step 604 if the slope of Tn/Tm no longer satisfies a threshold for locking. Returning to step 612, a result of step 612 may give two possible values (for the positive and negative slope) if the error on the laser frequency is sufficiently large. The two possibilities can be disambiguated either by examining the value of one of the other ratios (which will uniquely identify the frequency within a given period) or by picking one direction to move initially for the feedback loop, and moving in the other direction on subsequent cycles if this takes the laser further from the target frequency. Additionally in step 612, one of the other ratios may be checked to confirm the determined frequency, even in cases where there should be no ambiguity.

As described above, steps 604 and 605, for example, may be implemented on a control device. For example, steps 604 and 605 may be implemented on a processor acting as a controller or on multiple controllers (e.g., one for the optical frequency measurement device and one for the laser). In the case where separate controllers are used, in steps 611 and 612, for example, one or more controllers may have information identifying both the target frequency (which may generally be known to the laser) and the ratio Tn/Tm (which may generally be known to the optical frequency measurement device). In this case, whichever controller is used to perform this step, the relevant information (e.g., the target frequency or the ratio Tn/Tm) may be sent to the controller by another controller. In some implementations, a single control device may include the multiple controllers.

Process 600 may include additional implementations, such as any single implementation or any combination of implementations described below and/or in connection with one or more other processes described elsewhere herein.

Although FIG. 6 shows example steps of process 600, in some implementations, process 600 may include additional steps, fewer steps, different steps, or differently arranged steps than those depicted in FIG. 6. Additionally, or alternatively, two or more of the steps of process 600 may be performed in parallel.

FIGS. 7A-7C show example configurations 700 of an etalon. These are presented by way of example only, and any etalon having at least three sections, each of which has a similar FSR and each of which has transmission peaks that are separated from transmission peaks of the other sections by a phase difference, may be used. In some implementations, the transmission peaks (of each region of the etalon) are evenly separated across an FSR of the etalon.

FIG. 7A shows a solid etalon having three regions, the etalon including a main body 711, a first layer 712 (forming a first lamination), and a second layer 713 (forming a second lamination), all of which are made from a transparent material suitable for use as an etalon (e.g., quartz). The first lamination is attached to the main body in the first region and the second region, but is not present in the third region. The second lamination is attached to the first lamination, and is only present in the first region. As a result, the first region has a greater thickness than the second region, which has a greater thickness than the third region, and the optical path lengths of each section can be chosen by using different thicknesses for the main body and each lamination.

As an alternate means of forming the same structure as shown in FIG. 7A, a mask may be placed over the third region, and then the layer 712 applied by deposition. Subsequently, at least one mask may be placed over the second and third regions, and the layer 713 is applied by deposition. The masks are then removed to leave the layers 712 and 713 in place as shown. Additionally, a further layer (not shown) may be provided between the main body 711 and first layer 712 (either as a lamination or by deposition) to fine-tune the FSR of the etalon.

FIG. 7B shows a solid etalon having four regions, the etalon including a main body 721, a first lamination 722, a second lamination 723, and a third lamination 724. In this case, each lamination is attached to the main body, and each is present only in one region. The thickness of each lamination (plus the thickness of the main body) defines the path length for that region. In contrast to the other etalons shown in FIGS. 7A and 7C, the sections are not in order of thickness. In some implementations, this may be achieved with the other constructions by suitable arrangement of the laminations or etching to different depths.

FIG. 7C shows a solid etalon having three regions, formed as a single integral piece. In some implementations, this may be achieved by etching a suitable material, to form the required thicknesses. Additionally, or alternatively, each beam may pass through the etalon at a different angle—such that the path length of each beam is different, whether or not the thickness of the regions is different. Additionally, or alternatively, the regions may be provided on separate bodies (e.g., the etalon may be split over a number of etalon bodies, each including one or more of the regions). Additionally, or alternatively, the regions may be provided with some combination of different thicknesses and different refractive indices.

As indicated above, FIGS. 7A-7C are provided as examples. Other examples may differ from what is described with regard to FIGS. 7A-7C.

Figure 8:
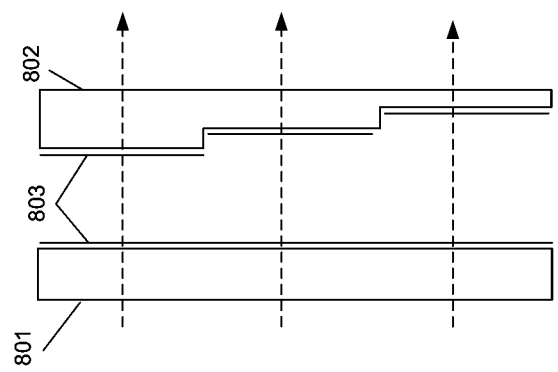
FIG. 8 is an example schematic illustration of an exemplary air-gapped etalon described herein.

FIG. 8 shows an example 800 of an air-gap type of etalon, including a first solid element 801 that is separated by an air gap from a second solid element 802. For example, the air-gap type of etalon may be formed from two bodies (or more than two bodies) separated by an air gap. For example, the etalon may be a sub-assembly of a frequency measuring device assembly, and the sub-assembly may include multiple bodies. The etalon may further include reflective surfaces 803 on each of the solid elements 801 and 802 to provide reflection for the etalon. Different path lengths of the sections are provided by providing the reflective surface of at least one of the solid elements 801 or 802 with a stepped profile, which may be constructed in a similar way to the stepped surfaces of FIG. 7A-7C.

While the above has disclosed etalons with only one stepped surface, it should be appreciated that the etalons could be constructed with stepped surfaces on both reflective surfaces (e.g., both the inner surfaces of FIG. 8, or both the top and bottom surface of FIG. 7C). While the above disclosed etalon regions are formed by either laminations or etching, other methods may also be used to form the etalons.

Splitting the input beam into separate beams for each of the sections may be done by a beam splitter. While the above description describes splitting the beams into, for example, three equal beams of equal intensity, it should be appreciated that other configurations are possible. If the beams are not split equally, the assembly may be calibrated to account for an unequal split by multiplying each ratio by a scaling factor to take into account the differing intensities of the split beams. The intensities of the split beams may have a consistent relationship to each other resulting in such scaling factors being constant.

As indicated above, FIG. 8 is provided as an example. Other examples may differ from what is described with regard to FIG. 8.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly. Further numerically relative terms, such as "approximately," "similar," and the like, may be used herein for ease of description. The numerically relative terms are intended to encompass, depending on the context, a numerical value within a threshold amount of another numerical value, such as a numerical value within 10%, 5%, 1%, or 0.5%, among other examples of another numerical value.

What is claimed is:

1. An assembly for use in a frequency measuring device, the assembly comprising:
    a beam splitter, configured to split an input beam into at least three beams;
    an etalon having at least three regions, positioned so that each of the at least three beams passes through a different region of the at least three regions,
        wherein each of the at least three regions has a different path length such that:
            each of the at least three regions has a similar free spectral range, and
            each of the at least three regions has transmission peaks, which are separated from the transmission peaks of other regions of the at least three regions by a phase difference;
    a detector configured to measure respective output intensities of each of the at least three beams; and
    a controller configured to determine a ratio of any one of the respective output intensities to any other one of the respective output intensities,
        wherein the ratio has a slope at the respective output intensities which is above a threshold.

2. The assembly of claim 1, wherein the etalon is a solid etalon, and has a stepped profile on at least one surface to give the different path length to each of the at least three regions.

3. The assembly of claim 1, wherein the etalon is formed from a single element.

4. The assembly of claim 1, wherein the etalon is formed from a main body and a plurality of laminations of different thicknesses attached to the main body, each of the plurality of laminations spanning a single of the at least three regions.

5. The assembly of claim 1, wherein the etalon is formed from a main body and a plurality of laminations, each of the plurality of laminations spanning at least one of the at least three regions and being attached to either the main body or another lamination of the plurality of laminations.

6. The assembly of claim 1, wherein the etalon is an air-gapped etalon comprising two bodies with an air gap therebetween.

7. The assembly of claim 6, wherein at least one of the two bodies has a reflective surface that has a stepped profile to give the different path length.

8. The assembly of claim 6, wherein at least one of the two bodies is formed from a main body and a plurality of laminations of different thicknesses attached to the main body, each of the plurality of laminations spanning a single of the at least three regions.

9. The assembly of claim 6, wherein at least one of the two bodies is formed from a main body and a plurality of laminations, each of the plurality of laminations spanning at least one of the at least three regions and being attached to either the main body or another lamination of the plurality of laminations.

10. The assembly of claim 1, wherein the transmission peaks of each of the at least three regions are evenly separated.

11. The assembly of claim 1, wherein the ratio is one of a plurality of ratios, and
    wherein the slope of the ratio is greater than all respective slopes of the plurality of ratios at the respective output intensities.

12. The assembly of claim 1, wherein the assembly is configured such that different input beams pass through the etalon at different angles.

13. The assembly of claim 1, wherein the etalon is a sub-assembly comprising a plurality of etalon bodies, each of the plurality of etalon bodies comprising one or more of the at least three regions.

14. An optical locker, comprising:
    an assembly, comprising:
        a beam splitter, configured to split an input beam into at least three beams;
        an etalon having at least three regions, positioned so that each of the at least three beams passes through a different of the at least three regions;
        a detector configured to measure respective output intensities of the at least three beams; and
        a controller configured to:
            determine a ratio, of any one of the respective output intensities to any other one of the respective output intensities,
                wherein the ratio has a slope at the respective output intensities which is above a threshold;
            obtain a target frequency of the input beam; and
            determine an actual frequency of the input beam based on the target frequency and the ratio.

15. The optical locker of claim 14, wherein the assembly further includes a laser, and
    wherein the laser has a target frequency and a frequency error, wherein the target frequency of the laser is the target frequency of the input beam and a free spectral range of each of the at least three regions is greater than the frequency error.

16. The optical locker of claim 15, wherein the controller is further configured to:

determine a difference between the actual frequency of the input beam and the target frequency; and adjust the laser such that the input beam is within a threshold amount of the target frequency.

17. A method comprising:

splitting, by an optical locker, an input beam into at least three beams, and passing each of the at least three beams through a different of an etalon of the optical locker;

providing, by the optical locker, a target frequency of the input beam;

measuring, by the optical locker, respective output intensities of each of the at least three beams;

determining, by the optical locker, a ratio of any one of the respective output intensities to any other one of the respective output intensities, wherein the ratio has a slope at the respective output intensities which is above a threshold;

determining, by the optical locker, an actual frequency of the input beam based on the target frequency and the ratio; and providing, by the optical locker, information identifying the actual frequency of the input beam based on determining the actual frequency.

18. The assembly of claim 1, wherein the ratio is self-normalizing such that none of the at least three beams are configured to be used as a reference beam.

19. The optical locker of claim 14, wherein the ratio is self-normalizing such that none of the at least three beams are configured to be used as a reference beam.

20. The method of claim 17, wherein the ratio is self-normalizing such that none of the at least three beams are configured to be used as a reference beam.

* * * * *